United States Patent [19]

Ogawa et al.

[11] Patent Number: 5,373,747
[45] Date of Patent: Dec. 20, 1994

[54] ROBOT HAND AND ROBOT

[75] Inventors: Hideki Ogawa, Inagi; Masao Obama, Yokosuka; Hideaki Hashimoto, Yokohama; Takao Furukawa, Kawasaki; Toshiya Umeda, Yokohama, all of Japan

[73] Assignee: Kabushiki Kaisha Toshiba, Kawasaki, Japan

[21] Appl. No.: 860,137

[22] Filed: Mar. 30, 1992

[30] Foreign Application Priority Data

| Mar. 30, 1991 | [JP] | Japan | 3-093020 |
| Oct. 21, 1991 | [JP] | Japan | 3-272936 |
| Nov. 8, 1991 | [JP] | Japan | 3-293199 |
| Nov. 8, 1991 | [JP] | Japan | 3-293201 |
| Nov. 25, 1991 | [JP] | Japan | 3-309324 |

[51] Int. Cl.$^5$ .................................. G01L 9/00
[52] U.S. Cl. ..................... 73/862.581; 73/862.041
[58] Field of Search .............. 73/65.08, 861.74, 861.75, 73/862.041, 862.581; 901/33, 34, 10, 46; 294/111

[56] References Cited

U.S. PATENT DOCUMENTS

| 3,535,711 | 10/1970 | Fick | 901/33 |
| 4,246,661 | 1/1981 | Pinson | 294/111 |
| 4,404,850 | 9/1983 | Hickmann | 73/862.581 |
| 4,446,747 | 5/1984 | Kamm | 73/862.581 |
| 4,586,387 | 5/1986 | Morgar et al. | 73/862.581 |
| 4,588,348 | 5/1986 | Beni et al. | 901/33 |
| 4,709,342 | 11/1987 | Hosoda et al. | 901/33 |
| 4,817,440 | 4/1989 | Curtin | 73/862.046 |
| 4,823,619 | 4/1989 | D'Antonio et al. | 73/862.581 |
| 4,921,293 | 5/1990 | Ruoff et al. | 294/111 |
| 5,010,774 | 4/1991 | Kikuo et al. | 901/46 |
| 5,062,673 | 11/1991 | Mirmura | 901/46 |
| 5,184,319 | 2/1993 | Kramer | 901/33 |

FOREIGN PATENT DOCUMENTS

| 2-256489 | 10/1990 | Japan | B25J 15/08 |
| 2256489 | 10/1990 | Japan | . |
| 1074711 | 2/1984 | U.S.S.R. | 901/33 |

OTHER PUBLICATIONS

H. Yoshinnada, et al., Proc. 7th Conf. on the Robotics Society of Japan, "Development of a tactile sensor for robot hands", pp. 567–568, Nov. 2, 1989.

S. C. Jacobsen, et al., "The UTAH/MIT Dextrous Hand: Work in Progress", The International Journal of Robotics Research, vol. 3, No. 4, pp. 21–50, Winter 1984.

Primary Examiner—Richard E. Chilcot, Jr.
Assistant Examiner—R. Biegel
Attorney, Agent, or Firm—Foley & Lardner

[57] ABSTRACT

A robot hand and a robot using it are provided. The robot hand has a finger-tip tactile sensor device, a palm tactile sensor device, and a tip contact force detecting device. Among them, the finger-tip tactile sensor device 10 has an elastic cap 14, in which a cavity 15 is formed with an opening 17a at a base end. The cavity is filled up with an incompressible fluid. A pressure detector 16 is inserted into the opening 17a of the cavity 17, and a holding member 18 holds the elastic cap 14 and the pressure detector 16. The holding member 18 is swingably mounted on a finger 1 of robot hand through a joint 2. When the elastic cap 14 contacts with an object, the contact pressure is detected through the incompressible fluid by the pressure detector 16.

9 Claims, 16 Drawing Sheets

ROBOT HAND AND ROBOT

BACKGROUND OF THE INVENTION

1. Field of the Invention

The present invention relates to a robot hand and a robot.

2. Description of the Related Art

A method for manipulating a robot hand with a plurality of fingers to stably grasp an object for a required work has been studied. A fingertip tactile sensor device is required for such grasping to detect a contact force and a contact condition between the respective fingertips and the object.

The conventional fingertip tactile sensor devices of this type have been developed and experimentally made as a touch sensor, most of which have such a complicated structure that numerous tactile elements are arranged in a matrix on a fingertip of a robot hand. Such fingertip tactile sensor devices fail to conduct accurate measurement in an area between the tactile elements, thus necessitating numerous tactile elements with high density on a fingertip of a robot hand.

However, if numerous tactile elements are disposed on a fingertip of a robot hand, it would be difficult to make the robot hand compact, and arrangement of signal lines for pressure detection would be extremely complicated. Also the fingertip could not be formed in a desired shape.

Further, it is normal to drive each of the finger joints of the robot hand through a wire by a motor distant from the joint without an actuator therein, requiring a long wire and complicated wiring. The contact force could be measured from a tension on the wire at the motor in such arrangement. However, the drive wire for the foremost joint tends to have a frictional force acting thereon along the wiring, so that the measurement of contact force may not be accurate through determining the tension of the wire at the motor.

For solving the above problems, a fingertip tactile sensor has been developed, in which a cavity provided in a fingertip cap is connected through a tube to a pressure detector for detecting a pressure change in the cavity due to a force applied onto the outer face of the cap. The pressure detector is located at a position where it will not interfere with the motion of the robot hand. This arrangement, however, requires a tedious setting of a tube upon attachment or exchange of fingertip tactile sensor. Furthermore, since the pressure detector is distant from the fingertip cap by the length of the tube, the response is slow to detect the contact force. In addition, when an object contacts the fingertip near the edge of the cavity, an output decreases from the pressure detector. The output from the pressure detector is affected by a difference in contact position on the outer face. Then, in the case where the contact position significantly changes on the outer face of fingertip upon manipulation of the object with fingertip, the contact force may not be accurately detected, presenting another problem.

SUMMARY OF THE INVENTION

It is, therefore, an object of the present invention to provide a robot hand and a robot using the same enabling accurate detection of contact pressure on a fingertip of a robot hand with quick response, taking the above described problems into consideration.

The first feature of the present invention is a fingertip tactile sensor device of a robot hand comprising, an elastic cap having a cavity filled with an incompressible fluid and provided with an opening at a base end thereof, a pressure detector connected to the opening of the cavity and detecting the fluid pressure, and a holding member to be attached to a finger of the robot hand, holding the elastic cap and pressure detector.

The second feature of the present invention is a palm tactile sensor device of the robot hand comprising, a pressure receiving member at least elastically deformable at a portion for receiving an external force, and attached to the palm of the robot hand, an incompressible fluid filling a cavity formed inside the pressure receiving member, and a pressure detector a part of which is in contact with the incompressible fluid.

The third feature of the present invention is a tip contact force detecting device of the robot hand comprising, a non-directional contact force detector attached to a tip of an arm to detect a force in contact with an object to be worked, first and second moment detectors attached to the arm to detect respective rotational moments not parallel to each other, caused by the force applied on the arm from the object, and a signal processing unit for calculating components of contact force of the arm tip with the object from the non-directional force detected by the contact force detector and the two rotational moments detected by the first and second moment detectors.

The fourth feature of the present invention is a multi-degree-of-freedom robot comprising, a force detector for detecting a motion of a portion corresponding to a detection freedom, which is one out of n freedoms ($n \geq 2$) of the multi-degree-of-freedom robot, an interference device for transmitting motions between portions corresponding to the other ($n-1$) freedoms, and motions between the portions corresponding to the other ($n-1$) freedoms and the portion corresponding to the detection freedom, and an operation device for calculating external forces on the respective portions corresponding to the other ($n-1$) freedoms, from the detection value detected by the force detector, wherein either of the external forces on the portions corresponding to the other ($n-1$) freedoms is transmitted to the portion corresponding to the detection freedom, and the transmitted force is calculated by the operation device.

The fifth feature of the present invention is a multi-degree-of-freedom robot comprising, a detection arm with a force detector, at least one transmission arm without a force detector, an interference device for transmitting motions between the detection and transmission arms, and between the transmission arms if any, and an operation device for calculating an external force on the transmission arm, from a detection value detected by the force detector, wherein the external force on the transmission arm is transmitted to the detection arm, and the transmitted force is calculated by the operation device.

The sixth feature of the present invention is a wire-driven multi-joint apparatus comprising a plurality of frames successively connected by a plurality of joints and a plurality of motors mounted on a base, in which each of the joints is driven through a wire which is wound between a drive pulley driven to rotate by a motor and a pulley provided on the joint, further provided with a tension sensor comprising a cantilever, the cantilever having a guide pulley at a tip thereof, which is related to the wire between the joint and the drive pulley, and urging the wire through the guide pulley to provide a tension thereon.

DESCRIPTION OF THE PREFERRED EMBODIMENTS First Embodiment

FIGS. 1-8 are drawings to show a fingertip tactile sensor device of a robot hand according to the first embodiment of the present invention.

Figure 1:
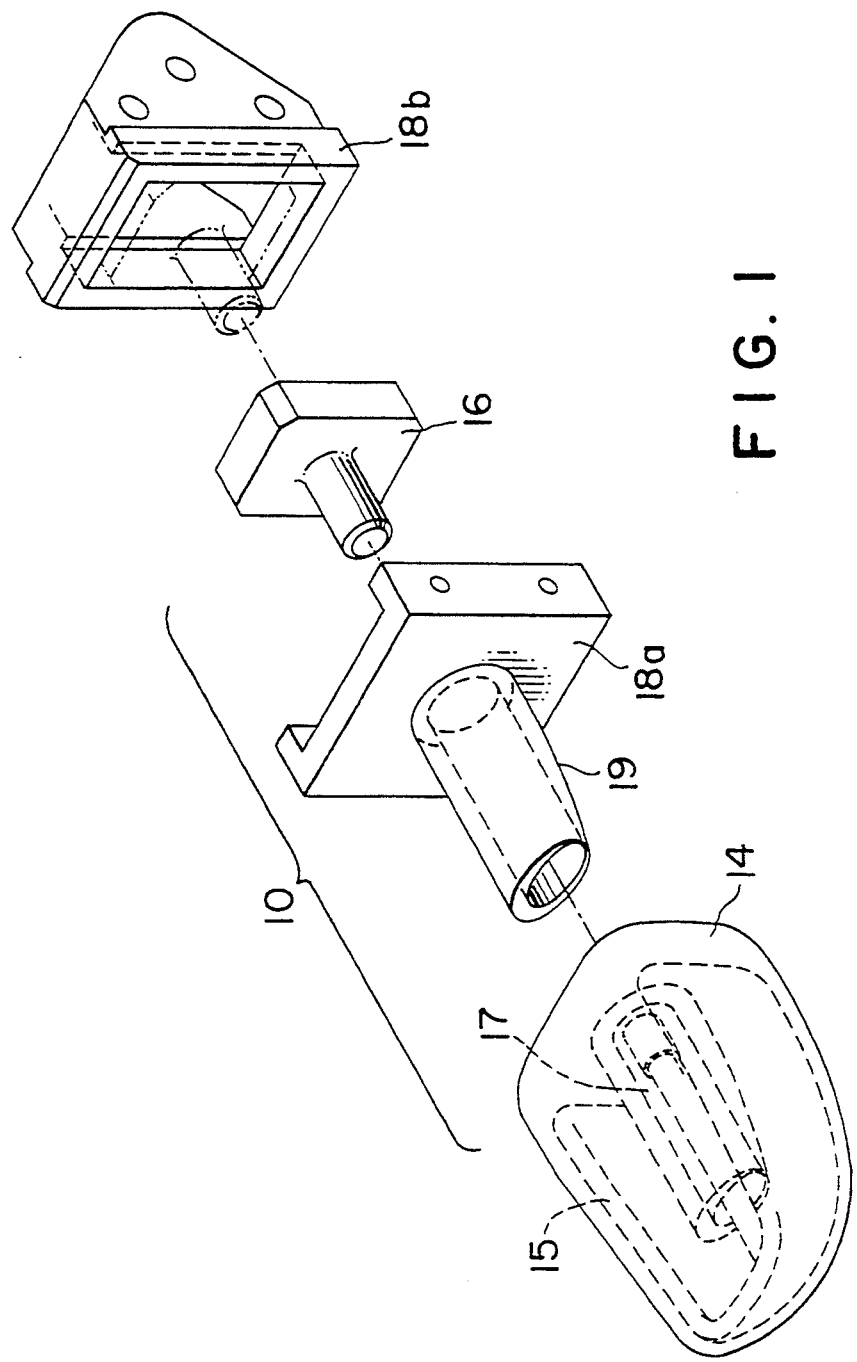
FIG. 1 is an exploded perspective view of a fingertip tactile sensor device illustrating a first embodiment of the present invention.
Figure 2:
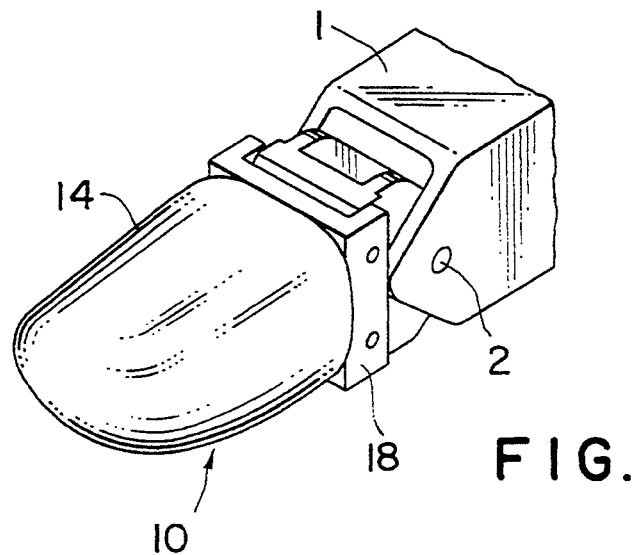
FIG. 2 is a perspective view of the fingertip tactile sensor device shown in FIG. 1.

FIGS. 1-2 show an assembly of the fingertip tactile sensor device. As shown in FIGS. 1 and 2, the fingertip tactile sensor device 10 has an elastic cap 14 made of an elastic material such as silicone rubber which is easy to fit onto a contact object. The elastic cap 14 is held by a holding member 18 having a holding cylinder 19. Also the holding member 18 holds a pressure detector 16 on the other side with respect to the elastic cap 14. The holding member 18 is swingably attached through a joint 2 to a finger 1 of a robot hand.

Figure 3:
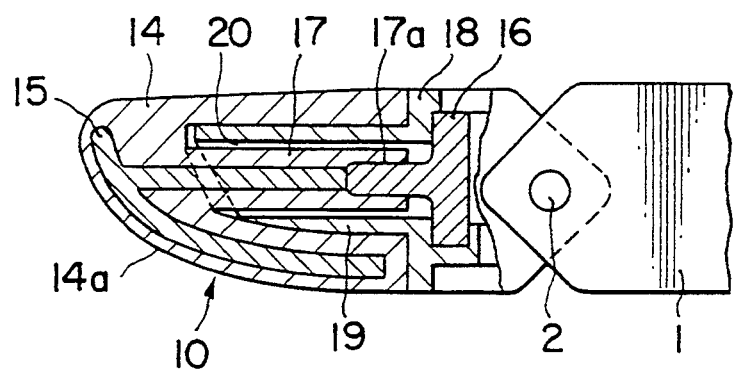
FIG. 3 is a vertical sectional view of the fingertip tactile sensor device shown in FIG. 1.
Figure 4:
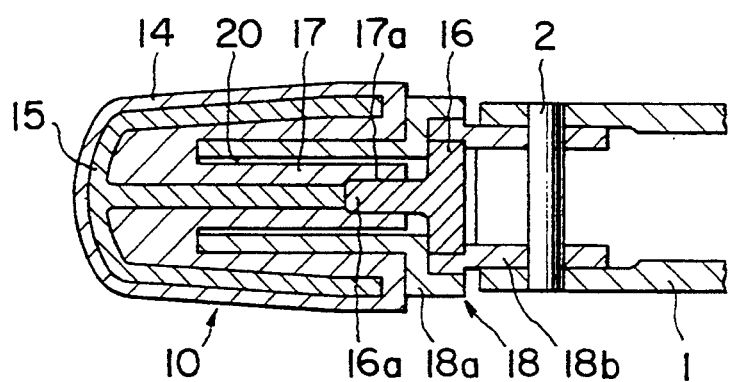
FIG. 4 is a horizontal sectional view of the fingertip tactile sensor device shown in FIG. 1.
Figure 5:
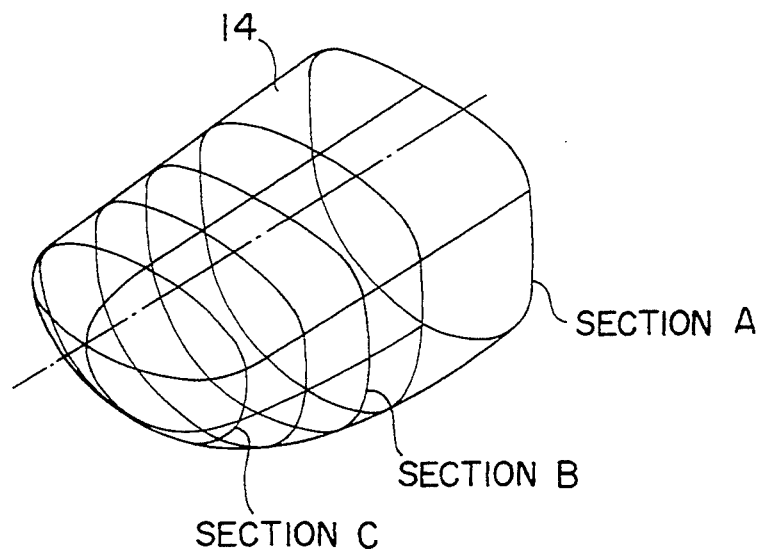
FIG. 5 is a perspective view showing the exterior appearance of an elastic cap of the fingertip tactile sensor device.

The elastic cap 14 will next be described in detail. The elastic cap 14 has a cylinder-like shape similar to that of a human fingertip. The elastic cap 14 has an inner cylinder 17 incorporated therewithin, as shown in FIGS. 3 and 4.

The elastic cap 14 contacts an object (not shown) at a contact surface 14a thereof, grasping the object. A cavity 15 formed inside the elastic cap 14 is filled with an incompressible fluid, for example castor oil. The cavity 15 is formed at least over the entire region of the contact surface 14a, extends into an inner cylinder 17, and opens at an opening 17a of the inner cylinder.

Figure 6:
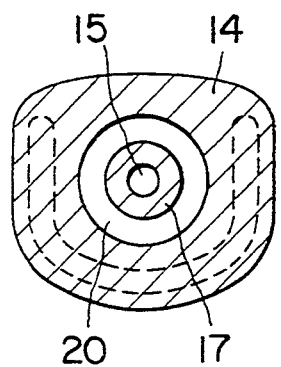
FIG. 6 is a section A of the elastic cap in FIG. 5.
Figure 7:
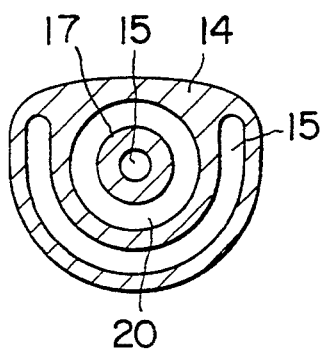
FIG. 7 is a section B of the elastic cap in FIG. 5.
Figure 8:
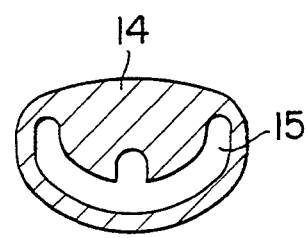
FIG. 8 is a section C of the elastic cap in FIG. 5.

The elastic cap 14 will be further described with reference to FIGS. 5-8. FIG. 6 shows a section A of the elastic cap of FIG. 5, FIG. 7 a section B of the elastic cap of FIG. 5, and FIG. 8 a section C of the elastic cap of FIG. 5.

The elastic cap 14 has a longitudinal axis extending from the base side or the side of opening 17a to the tip side thereof. The profile of the elastic cap 14 is substantially cylindrical in each of the sections normal to the axis. Also, the profile of the elastic cap 14 decreases in size gradually from the base side to the tip side in the cross sections normal to the axis.

The holding member 18 comprises a tip-side holding member 18a having the holding cylinder 19 and a base-side holding member 18b. The holding cylinder 19 is inserted into a space 20 formed around the inner cylinder 17 to closely contact the inner surface of the elastic cap 14 thereby to hold the elastic cap 14.

In this way, the elastic cap 14 is securely held by the holding cylinder 19. Accordingly, the elastic cap 14 can not be excessively deformed by the contact pressure applied to the contact surface 14a, and therefore the contact pressure may be properly transmitted to the pressure detector 16 by the incompressible fluid within the elastic cap 14. The base-side holding member 18b holds the pressure detector 16 and is swingably attached through the joint 2 to the finger 1 of the robot hand.

The pressure detector 16 has a cylindrical detecting section 16a, which is inserted into the opening 17a of the inner cylinder 17 to detect the pressure of fluid within the cavity 15. The pressure detector 16 includes a semiconductor pressure sensor of diaphragm type (not shown). An output from the semiconductor pressure sensor is amplified by an amplifier to be output as a voltage signal therefrom.

In this way, the pressure detector 16 is securely held by the base-side holding member 18b and the cylindrical detecting section 16a of the pressure detector 16 is inserted into the opening 17a of the inner cylinder 17. Even if an excessive contact pressure is applied to the contact surface 14a of the elastic cap 14, the pressure detector 16 can not be broken because the space 20 is formed between the contact surface 14a and the inner cylinder 17 connected to the cylindrical detecting section 16a of the pressure detector 16.

The fingertip tactile sensor device of the above described construction operates in the following manner.

In the grasping operation of the robot hand, the contact surface 14a of the elastic cap 14 contacts an object to grasp it. Then the pressure of the fluid in the cavity 15 increases due to the contact pressure applied by the object to the contact surface 14a. The pressure rise of the fluid in the cavity 15 is detected by the semiconductor sensor in the pressure detector 16, and the resulting output from the semiconductor sensor is amplified by the amplifier to be output as a voltage signal therefrom.

In the present embodiment, since the outer shape of the elastic cap 14 is substantially cylindrical in section normal to the axis and the sections gradually decrease in size from the base side to the tip side, the object can be readily grasped. Also, since the cavity 15 of the elastic cap 14 is formed over the entire region of the contact surface 14a with the object, the contact pressure on the elastic cap 14 is positively and accurately detected upon contact of object with any part of the contact surface 14a. Further, since the pressure detector 16 is directly inserted into the opening 17a of the cavity 15, the pressure rise of the fluid in the cavity 15 is positively and quickly detected. In addition, since the elastic cap 14 and the pressure detector 16 are held together by the holding member 18, they may be exchanged together from the finger 1 of the robot hand, thereby allowing easy exchange.

As described above, according to the present invention, when the pressure of the fluid in the cavity is increased due to the contact pressure applied by the object to the elastic cap, the pressure rise of the fluid is detected directly by the pressure detector inserted into the opening of the cavity, so that the contact pressure is quickly and positively detected. Also, the elastic cap and the pressure detector are held together by the holding member, so that they can be exchanged together from the finger of the robot hand, thereby allowing easy exchange.

Second Embodiment

A second embodiment according to the present invention will now be described with reference to FIGS. 9–13 which show a palm tactile sensor device of a robot hand according to the present invention.

Figure 9:
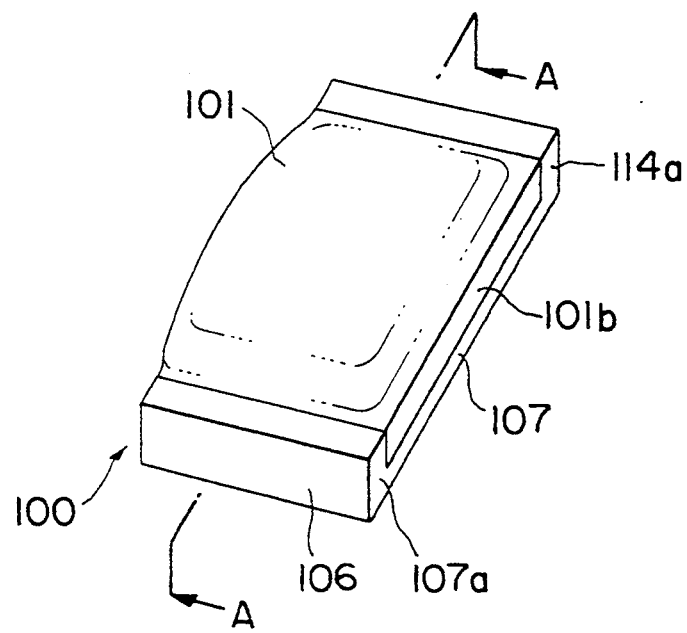
FIG. 9 is a perspective view showing the external appearance of a palm tactile sensor device of a robot hand illustrating a second embodiment of the present invention.
Figure 10:
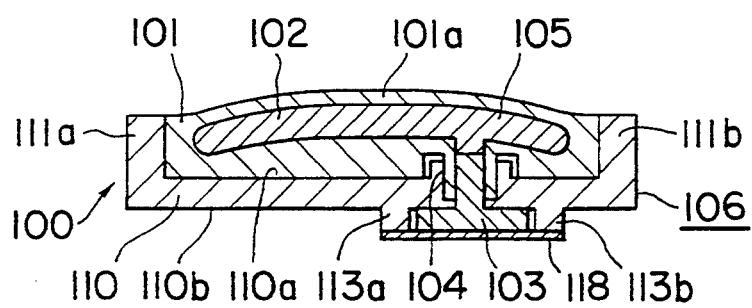
FIG. 10 is a vertical sectional view taken in the plane indicated by the line A—A of FIG. 9 as viewed in the direction of the arrows.

FIG. 9 shows the external appearance of the palm tactile sensor device of the robot hand. FIG. 10 shows a vertical section taken in the plane of line A—A as viewed in the direction of the arrows of the palm tactile sensor device shown in FIG. 9.

In FIG. 10, the palm tactile sensor device 100 has a pressure receiving member 101 made of an elastic material. A cavity 102 is formed within the pressure receiving member 101 and is filled with an incompressible fluid 105. The cavity 102 is formed to extend along an outer surface of the pressure receiving member 101. This outer surface is a pressure receiving face 101a of the pressure receiving member 101 receiving an external force. It has a thinner thickness than the other parts of the pressure receiving member 101 thereby to readily transmit the external force to the incompressible fluid 105. A tube portion 104 is formed on the bottom of the pressure receiving member 101.

A pressure detector 103 is provided to contact the incompressible fluid 105 inside the tube portion 104. A fluid contact section 115 of the pressure detector 103 is inserted into the tube portion 104.

The pressure receiving member 101 and the pressure detector 103 are supported by a supporting member 106 with substantially the same width as the pressure receiving member 101. The supporting member 106 has upstanding walls 111a, 111b at the two edges of a base 110 thereof. The pressure receiving member 101 is fitted in between the walls 111a and 111b. A bore 112 is formed on the upper face 110a of the base 110 of the supporting member 106, and the fluid contact section 115 of the pressure detector 103 is inserted into this bore 112. Ribs 113a, 113b are disposed on the lower face 110b of the base 110 to face each other, and a bottom part 116 of the pressure detector 103 is inserted into a recess 114 formed by the ribs 113a, 113b. The height of the bottom part 116 is substantially the same as those of the ribs 113a, 113b. After the bottom part 116 is inserted into the recess 114, the pressure detector 103 is held by a lid 118.

A signal line from the pressure detector 103 passes through the lid 118 and is connected to a signal processing unit (not shown).

In this way, the pressure receiving member 101 and the pressure detector 103 are securely supported by the supporting member 106, and the fluid contact section 115 of the pressure detector 103 is inserted into the bore 112 of the supporting member 106. Accordingly, the pressure receiving member 101 can not be excessively deformed by the contact pressure applied to the pressure receiving member 101, and therefore the contact pressure may be properly transmitted to the pressure detector 103 by the incompressible fluid 105. Furthermore even if an excessive contact pressure is applied to the pressure receiving member 101, the pressure detector 103 can not be broken because the pressure detector 103 is securely supported by the supporting member 106.

Figure 11:
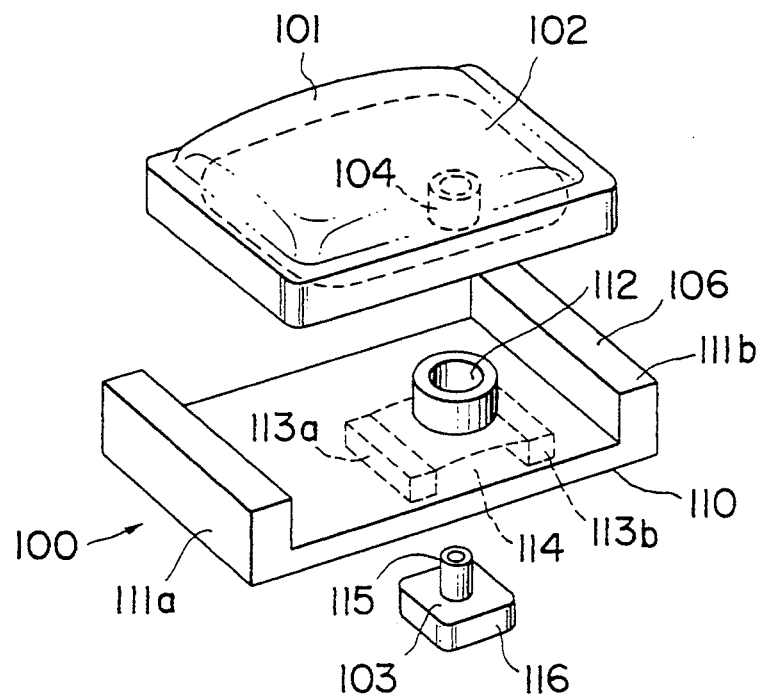
FIG. 11 is an exploded perspective view of the device shown in FIG. 9.

FIG. 11 is an exploded perspective view of the pressure receiving member 101, the supporting member 106, and the pressure detector 103. As seen from FIG. 11, the palm tactile sensor device 100 of a robot hand of the present embodiment is extremely simply constructed.

Figure 13:
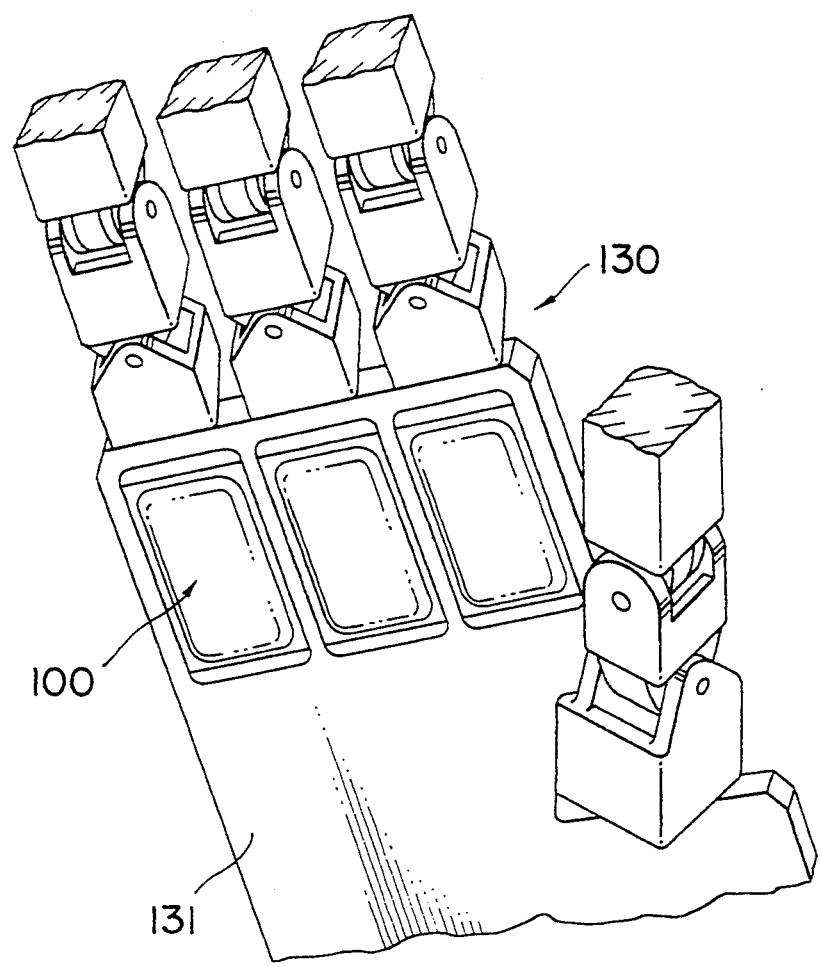
FIG. 13 is a perspective view showing a robot hand to which the palm tactile sensor device of robot hand of the embodiment according to the present invention is attached.

As shown in FIG. 13, a plurality of palm tactile sensor devices 100 of a robot hand may be arranged adjacent to each other on a palm 131 of the robot hand 130. In such a case, longitudinal ends 107a of the supporting members 106 as shown in FIG. 9 are arranged adjacently to each other. Also, it is possible to make adjacent sides 101b of the pressure receiving members 101 contact each other at the opening side edges of the supporting members 106.

The operation of the palm tactile sensor device 101 of the above described construction is as follows.

The palm tactile sensor device 101 of robot hand is attached to the palm 131 of the robot hand. The palm 131 of robot hand grasps an object to be worked. Then the pressure receiving portion 101a of the pressure receiving member 101 elastically deforms with the applied force by the object. The incompressible fluid 105 filling the cavity 102 receives a pressure due to the elastic deformation, and the pressure is transmitted to the pressure detector 103 in contact with the incompressible fluid to detect the force of palm 131 grasping the object.

According to the present embodiment as described, the palm tactile sensor device of the robot hand is simply constituted by the pressure receiving member 101, the incompressible fluid 105, the pressure detector 103, and the supporting member 106.

Since the palm tactile sensor device is simply constructed, it can be produced at low cost. Further, the arrangement of the signal line may also be simplified, different from the conventional arrangement of numerous tactile elements in a matrix.

Since the incompressible fluid 105 is used as a pressure transmission medium in the present embodiment, there is no insensible region between elements, different from the conventional arrangement of tactile elements in a matrix. This allows accurate detection of contact force over a broad region. Consequently, even if a contact point between the object and a palm surface is changed by rotation upon manipulation of the grasped object with fingers, the contact force is continuously detected during the operation irrespective of the contact point.

Further, since the supporting member 106 is provided, the device can be readily attached to the palm 131 of the robot hand.

Furthermore, since the standing walls 111a, 111b are provided on two edges of the base 110 of the supporting member 106, the pressure receiving member 101 can be readily attached to the supporting member 106.

In addition, since the standing walls 111a, 111b are provided on two edges of the base 110 of the supporting member 106, a plurality of palm tactile sensor devices 100 of the robot hand can be attached adjacent to each other on the palm 131 of the robot hand.

Also, since the supporting member 106 has substantially the same width as the pressure receiving member 101, the sides 111b of adjacent pressure receiving members can each other at the opening side edges 107 of the supporting members 106. Thus a plurality of palm tactile sensor devices 100 of the robot hand can be closely attached to each other on the palm 131 of the robot hand. Accordingly, in the case where a plurality of the palm tactile sensor devices of the robot hand are arranged on the palm 131 of the robot hand, no insensitive region exists between the palm tactile sensor and the neighbouring palm tactile sensors.

If a great force is expected to be detected, the thickness of the pressure receiving face 101a should be increased. The thickness of the pressure receiving face 101a may be adjusted depending on a range of detection forces to be detected.

Instead of the provision of the supporting member 101, the pressure receiving member 101 may be formed to have a thicker part of the elastic member except the pressure receiving face 101a.

Next, with reference to FIG. 12, a modification of the palm tactile sensor device of the robot hand will be described.

Figure 12:
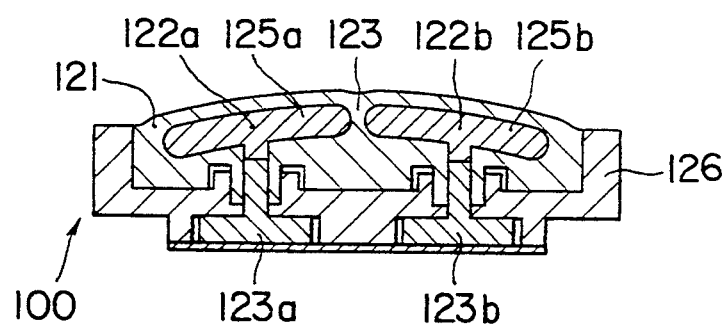
FIG. 12 is a vertical sectional view showing a modification of the palm tactile sensor device of a robot hand according to the present invention.

In FIG. 12, there are two cavities 122a, 122b divided by a divider 123 and arranged in parallel in the same plane in a pressure receiving member 121. The cavities 122a, 122b divided by the divider 123 is filled with respective incompressible fluids 125a, 125b, and respective pressure detectors 123a, 123b are provided to correspond to the incompressible fluids 125a, 125b. The number of the cavities and the pressure detectors is not limited to two, and may be increased.

In the present embodiment as shown in FIG. 12, there are two cavities 122a, 122b and two pressure detectors 123a, 123b corresponding thereto provided for one pressure receiving member 121, so that the contact force and the contact condition with an object can be detected more precisely for each of the cavities 122a, 122b.

As explained above, according to the present invention, since there are provided the pressure receiving member, the incompressible fluid, and the pressure detector, the palm tactile sensor device is adapted to be easily mounted on the palm of a robot hand in a simple structure. Thus, easy signal processing and precise detection of the contact force with the object are afforded.

Third Embodiment

A third embodiment according to the present invention will now be described with reference to FIGS. 14-17 showing a tip contact force detecting device of a robot hand according to the present invention.

Figure 14:
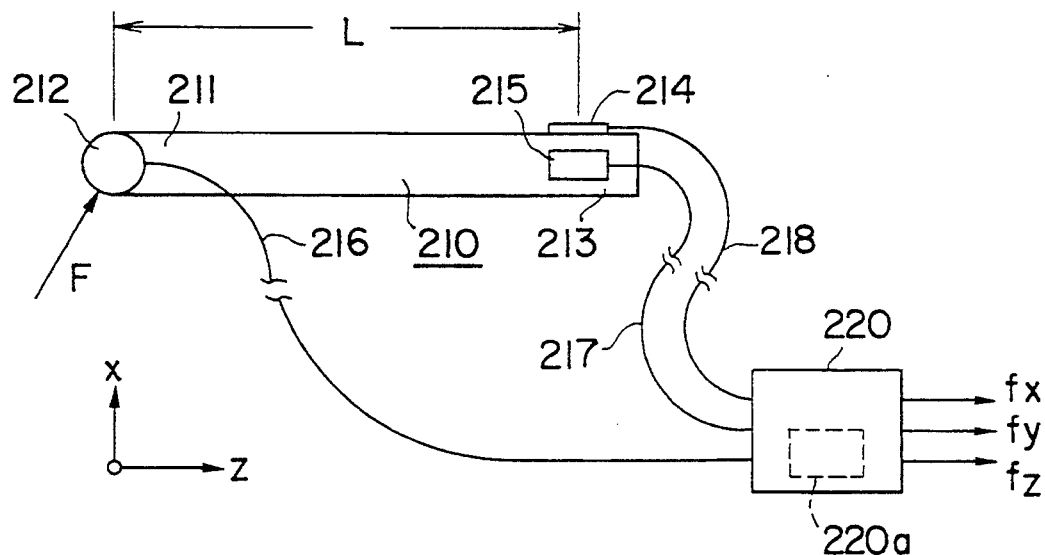
FIG. 14 is a diagram showing a schematic organization of a tip contact force detecting device of a robot hand as a third embodiment of the present invention.

In FIG. 14, the x-axis is taken vertically upward, the z-axis horizontally left to right, and the y-axis from the back to this (the viewer's) side normally to the drawing.

In FIG. 14, reference numeral 210 denotes an arm of the robot. A non-directional contact force detector 212 is mounted at the free end 211 of the arm 210 to detect an amplitude of force F with which the free end 211 contacts an object to be worked. The force F is represented by components in the x-, y-, z-axes as F=(fx, fy, fz) and the amplitude of the force F as $_{ABS}F$.

A strain gauge 214 is mounted on the upper face of rear or inner end 213 opposite from the outer free end of the arm 210. Another strain gauge 215 is mounted on a side face of the rear end 213. The strain gauge 214 detects a rotational moment Mx which is caused by the x-component fx of the force F applied on the free end 211 by the object. The strain gauge 215 detects a rotational moment My caused by the y component fy of the force F applied on the free end 211 by the object.

A signal processing unit 220 is provided in the tip contact force detecting device. Signals from the contact force detector 212 and the strain gauges 214, 215 are transmitted through wires 216, 217, 218 to the signal processing unit 220.

Figure 15:
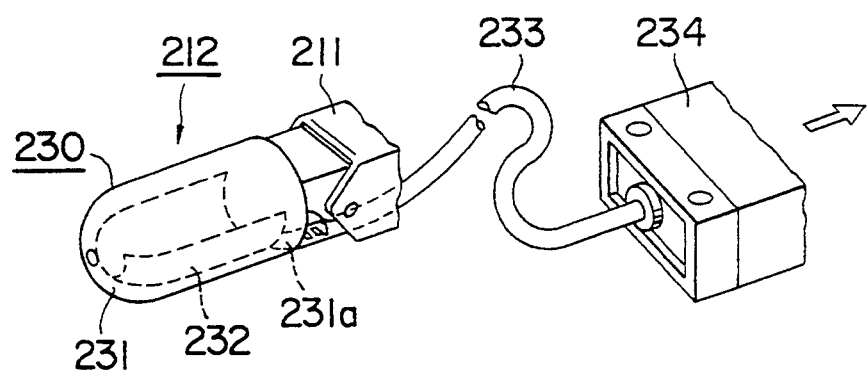
FIG. 15 is a perspective view showing a non-directional contact force detector of the tip contact force detecting device shown in FIG. 14.

FIG. 15 shows an example of the structure of the contact force detector 212. In FIG. 15, the contact force detector 212 has a contactor 230 for contacting the object. The contactor 230 has a rubber cap 231 with an opening 231a at one end and a sealed liquid 232 sealed inside the rubber cap 231. One end of a tube 233 is connected to the opening 231a, and the other end of the tube 233 to a pressure transducer 234.

When the contactor 230 contacts the object and receives a reaction force from the object, the rubber cap 231 is elastically deformed. The pressure transmitted to the sealed liquid 232 due to the elastic deformation is transmitted through the tube 233 to the pressure transducer 234, where it is converted into an electric signal and then output through the wire 216 to the signal processing unit 220.

The operation of the detecting device of the above described construction is as follows.

In FIG. 14, a length between the center of the contact force detector 212 and the strain gauges 214, 215 is defined as L. Rotational moments Mx, My detected by the strain gauges 214, 215 are obtained from the following equations (1) and (2).

$$Mx = fx \cdot L \qquad (1)$$

$$My = fy \cdot L \qquad (2)$$

From the equations (1) and (2), the components fx, fy of the force F are obtained as in equations (3) and (4).

$$fx = Mx/L \qquad (3)$$

$$fy = My/L \qquad (4)$$

Also, the amplitude $_{ABS}F$ of the force F is given by the following equation (5).

$$(_{ABS}F)^2 = fx^2 + fy^2 + fz^2 \qquad (5)$$

Placing the equations (3) and (4) into the equation (5), the unknown component fz is obtained as in the following equation (6).

$$fz = ((_{ABS}F)^2 - (Mx^2 + My^2)/L^2)^{\frac{1}{2}} \qquad (6)$$

Thus three components fx, fy, and fz of the force F can be obtained from the equations (3), (4), and (6). The signal processing unit 220 carries out the calculations by an electric circuit or a calculator.

In the above arrangement of the present embodiment, the non-directional tip contact force detector 212 is mounted at the free end 211 of arm 210 of the robot, and the strain gauges 214, 215 are mounted at the rear end 213 of the arm 210 to detect respective rotational moments, so that the respective axial components fx, fy, and fz of the force F, with which the free end 211 contacts the object, can be obtained.

Further, only the non-directional contact force detector 212 is mounted at the free end 211, and the strain gauges 214, 215 can be mounted at the rear end 213 of arm 210, which allows the tip contact force detecting device of the present embodiment to be readily installed in a compact robot.

Also, since the number of the signal wires from the free end 211 to the signal processing unit 220 is reduced, the wires rarely construct spatial obstacles or impose physical loads to interfere with the motion of the robot.

If the strain gauges are attached to the free end 211 to obtain a higher sensitivity of detection, the free end 211 must be made of a material of low stiffness. But the strain gauges are not attached to the free end 211 in the present embodiment, so that the stiffness of the free end 211 of robot need not be lowered.

Suppose that no detection signal is detected by the contact force detector 212 and that detection signals are detected by the strain gauges 214, 215. This may be considered as a contact with the object at a position other than the free end 211. This judgment is made by a judgment device 220a in the signal processing unit 220.

Next, with reference to FIGS. 16 and 17, a modification of the above embodiment according to the present invention will be described.

In the preceding embodiment shown in FIG. 14, the length L between the center of the contact force detector 212 and the strain gauges 214, 215 is constant. In contrast, the modification as shown in FIG. 16 is the case wherein the present invention is applied to a multi-joint robot with three links of three degrees of freedom, considering that ordinary robots have multiple joints.

Figure 16:
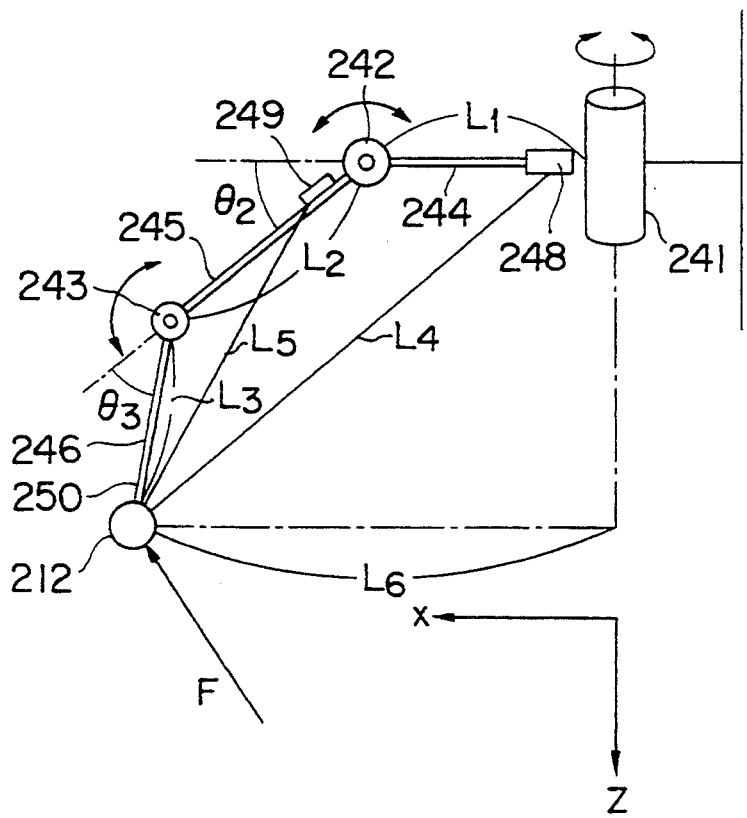
FIG. 16 is an explanatory diagram showing a schematic organization of a modification of the tip contact force detecting device of a robot hand according to the present invention.

In FIG. 16, numerals 241, 242, 243 denote rotation shafts. The rotation shaft 241 is parallel to the plane of the drawing, and the rotation shafts 242, 243 are perpendicular to the plane of the drawing. The numerals 244, 245, 246 denote arms. The arm 244 is rotatable around the rotation shaft 241, the arm 245 around the rotation shaft 242, and the arm 246 around the rotation shaft 243. A strain gauge 248 is mounted at the root of the arm 244 to detect rotational moments of the rotation shaft 241, and a strain gauge 249 is mounted at the root of the arm 245 to detect rotational moments of the rotation shaft 242. A non-directional contact force detector 212 is mounted on the free or outer end 250 of the arm 246.

The length between the rotation shafts 241 and 242 is defined as $L_1$, the length between the rotation shafts 242 and 243 as $L_2$, the length between the rotation shaft 243 and the contact force detector 212 as $L_3$, the length between the strain gauge 248 and the contact force detector 212 as $L_4$, and the length between the strain gauge 249 and the contact force detector 212 as $L_5$. For simplification of description, the strain gauges 248, 249 are assumed to be located at the respective rotation shafts 241, 242.

Also the amplitude of force detected by the contact force detector 212 is defined as $_{ABS}F$, and rotational moments detected by the strain gauges 248, 249 as $M_1$, $M_2$, respectively.

In the coordinate system employed in FIG. 16, the x-axis extends horizontally to the left, the z-axis downward, and the y-axis down into the drawing normally to the drawing. Then the rotation shaft 241 resides on the z-axis, and the arm 244 on the x-axis. In this coordinate system, fx, fy, fz are respective axial components of the contact force F with which the free end of the arm 246 contacts the object. Rotation angles of the respective rotation shafts 241, 212, 213 are defined as $\theta_1$, $\theta_2$, $\theta_3$ with respect to initial positions thereof.

$M_1$ detected by the strain gauge 248 depends on a length $L_6$ of a normal line from the tip contact force detector 212 to the z-axis and a component fy of the contact force normal to the plane of the drawing.

The length $L_6$ is given by the following equation (7).

$$L_6 = L_1 + L_2 \cdot \cos \theta_2 + L_3 \cdot \cos(\theta_2 + \theta_3) \qquad (7)$$

Also the rotational moment $M_1$ is given by the following equation (8).

$$M_1 = (L_1 + L_2 \cdot \cos \theta_2 + L_3 \cdot \cos(\theta_2 + \theta_3)) \cdot fy \qquad (8)$$

Therefore, the component fy can be obtained from the equation (8) as in the following equation (9).

$$fy = M_1/(L_1 + L_2 \cdot \cos \theta_2 + L_3 \cdot \cos(\theta_2 + \theta_3)) \qquad (9)$$

The components fx, fz can be obtained as described below with reference to FIG. 17.

$_{ABS}F_{xz}$ represents the amplitude of the force $_{ABS}F$ excluding the y-component fy detected by the contact force detector 212. The position coordinates of the contact force detector 212 are defined as $(P_x, 0, P_z)$, the position coordinates of the strain gauge 249 as $(P_{2x}, 0, P_{2z})$, the angle of a line connecting the strain gauge 249 and the contact force detector 212 as $\omega$ with respect to the x-axis, and the angle of a line connecting the strain gauge 249 and the contact force detector 212 as $\xi$ with respect to the direction of the force $F_{xz}$. The force $F_{xz}$ means a force obtained by vector addition of the components fx and fz of the force F.

Figure 17:
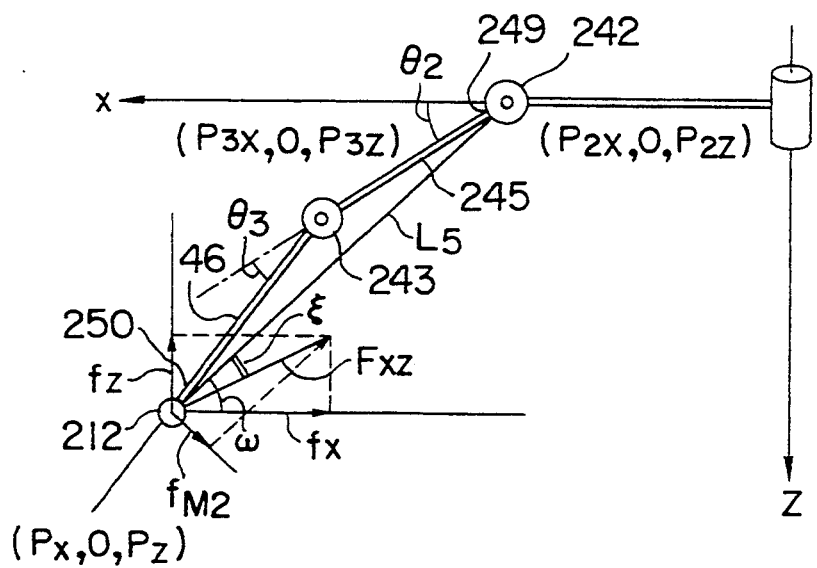
FIG. 17 is a complimentary explanatory diagram showing a schematic organization of the modification shown in FIG. 16.

Referring to FIG. 17, it is seen that the following equations (10) to (13) are valid.

$$P_{2x} = L_1 \tag{10}$$

$$P_{2z} = 0 \tag{11}$$

$$P_x = L_1 + L_2 \cdot \cos\theta_2 + L_3 \cdot \cos(\theta_2 + \theta_3) \tag{12}$$

$$P_z = L_2 \cdot \sin\theta_2 + L_3 \cdot \sin(\theta_2 + \theta_3) \tag{13}$$

Using the angle $\xi$, the rotational moment $M_2$ is expressed by the following equation (14).

$$M_2 = L_5 \cdot (\sin\xi) \cdot {}_{ABS}F_{xz} \tag{14}$$

Thus the angle $\xi$ may be represented by the following equation (15).

$$\xi = \sin^{-1}(M_2/(L_5 \cdot {}_{ABS}F_{xz})) \tag{15}$$

On the other hand, the angle $\omega$ may be expressed by the following equation (16).

$$\omega = \tan^{-1}((P_z - P_{2z})/(P_x - P_{2x})) \tag{16}$$

Therefore, the angles $\xi$, $\omega$ are expressed by known parameters which are detectable.

The components fx, fz can be calculated as follows using the angles $\xi$, $\omega$ obtained from the equations (15) and (16).

$$fx = {}_{ABS}F_{xz} \cos(\omega - \xi) \tag{17}$$

$$fz = {}_{ABS}F_{xz} \sin(\omega - \xi) \tag{18}$$

According to the above arrangement of the present embodiment, in the robot with three degree of freedom, the non-directional contact force detector 212 is mounted on the free end 250 of the arm 246 of the robot, and the strain gauges 248, 249 are mounted at the roots of the arms 244, 245 to detect the rotational moments, whereby the respective axial components fx, fy, fz of the force F, with which the free end 250 contacts with the object, may be obtained.

The above described modification shows the robot with three degrees of freedom. A robot with n degrees of freedom where (n≧1) can be constructed and three directional components of the contact force with the object at the free end of the robot can be obtained similarly using an appropriate geometric solution as in the modification.

The two strain gauges are not always arranged to detect the rotational moments of two directions perpendicular to each other, but may be arranged to detect two rotational moments not perpendicular to each other.

In the above explanation, the object was an object to be worked by the free end of robot. However, the present embodiment can be applied to a contact with another arm of the robot.

As explained above according to the present invention, since the non-directional tip contact force detector is attached to the free end of the robot, and the first and second moment detectors are provided to detect two rotational moments not parallel to each other, the amplitude and direction of the force, with which the free end of the robot contacts with the object to be worked, can be obtained.

Fourth Embodiment

Figure 18:
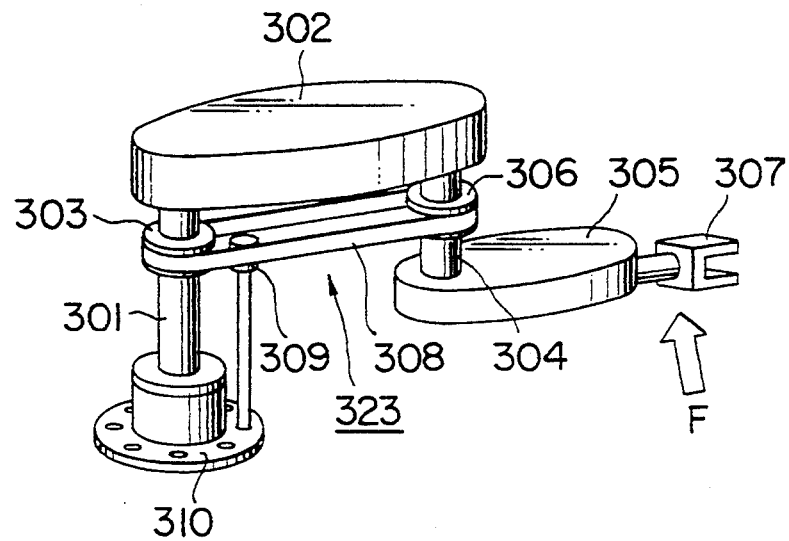
FIG. 18 is a perspective view showing a specific structure of a multi-degree-of-freedom robot constituting a fourth embodiment of the present invention.
Figure 19:
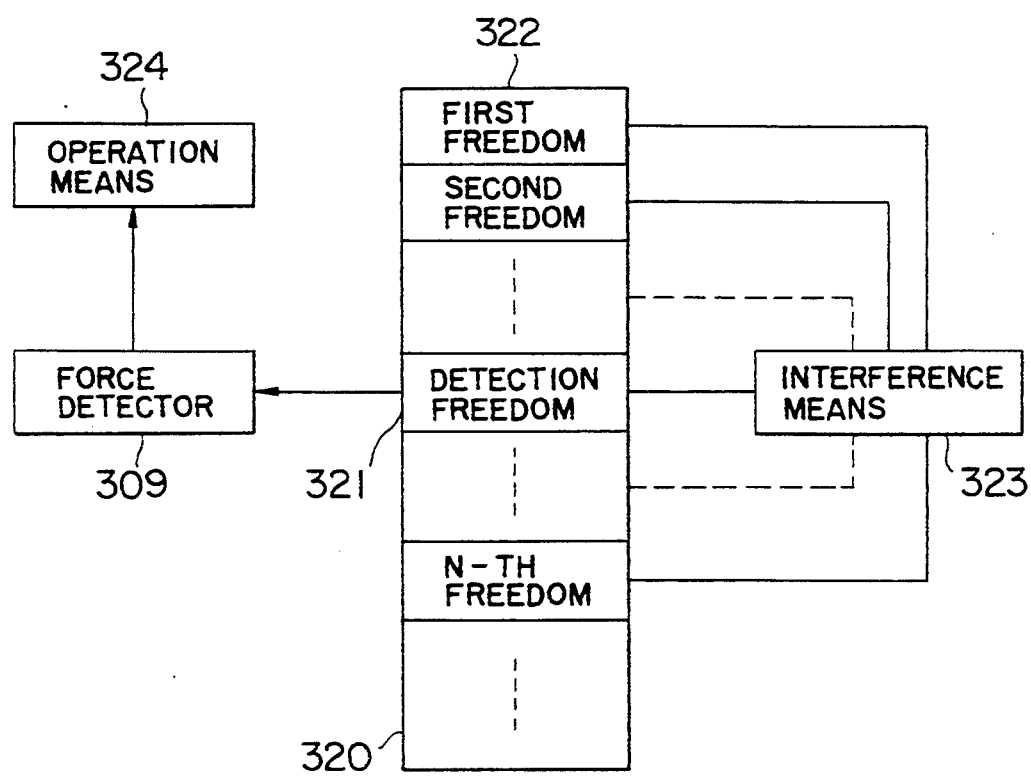
FIG. 19 is a block diagram of the multi-degree-of-freedom robot shown in FIG. 18.
Figure 20:
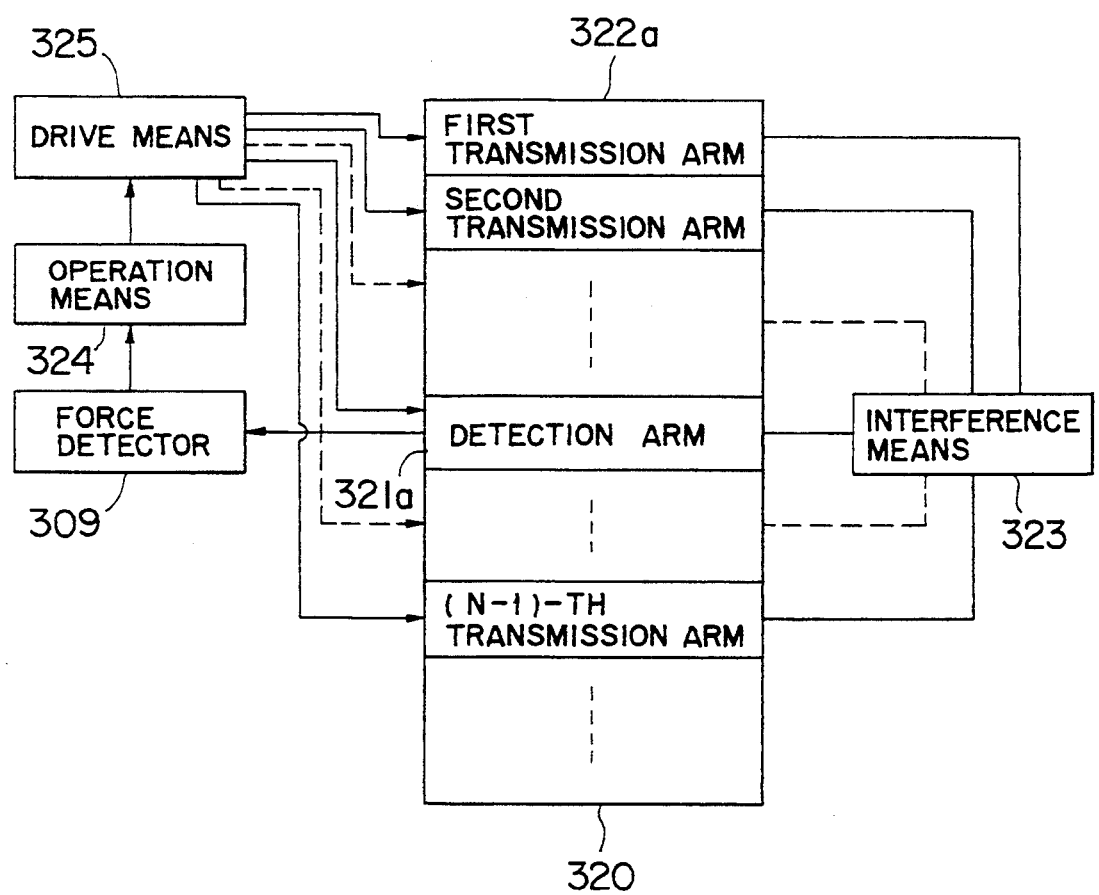
FIG. 20 is a block diagram of a modification of the multi-degree-of-freedom robot.

Below explained with the drawings is the fourth embodiment of the present invention. FIGS. 18–20 show a multi-degree-of-freedom robot according to the present invention.

First explained with reference to FIG. 19 is a general structure of robot according to the present invention. In FIG. 19, a multi-degree-of-freedom robot 320 has freedom degrees of not less than n. One out of n freedoms (n≧2) serves as a detection freedom 321, and a force detector 309 is attached to a portion corresponding to the detection freedom 321. An interference means 321 is provided to transmit a force between portions corresponding to n freedoms 321, 322. When one of portions corresponding to the (n−1) freedoms 322 other than detection freedom 321 receives an external force directly from a collision, the force is transmitted through the interference means 323 to the portion corresponding to the detection freedom 321. The transmitted force is detected by a force detector 309 attached to the portion corresponding to the detection freedom 321. An operation means 324 is provided to calculate an external force received through the interference means 323 on the portions corresponding to the (n−1) freedoms 322 excluding the detection freedom 321. The operation means 324 calculates the force from the detection value of the force detector 309, using known data about transmission of force between respective freedoms in use of the interference means 323.

FIG. 18 shows an embodied example of the above embodiment.

In FIG. 18, a robot has two degrees of freedom, in which a first shaft 301 is attached to a base 310, a first arm 302 is rotatably attached to the first shaft 301, a second shaft 304 is attached to a free end of the first arm 302, a second arm 305 is rotatably attached to the second shaft 304, and a hand 307 is attached to an extension of the second arm 305 to work on an object to be worked.

Further, a first pulley 303 is mounted on the first shaft 301, a second pulley 306 on the second shaft 304, and an interference belt 308 connects between the first and the second pulleys 303, 306. The first pulley 303, the second pulley 306, and the interference belt 308 constitute the interference means 323.

A force detector 309 is attached to a circumference of the first pulley 303. The interference belt 308 is wound around the detection face of the force detector 309 to detect a tension $T_1$ on the interference belt 308 by the force detector 309.

An interference matrix of the interference means 323 is obtained from the following equation (19).

$$\begin{pmatrix} \theta_1' \\ \theta_2' \end{pmatrix} = \begin{pmatrix} 1 & 0 \\ r10/r20 & 1 \end{pmatrix} \begin{pmatrix} \theta_1 \\ \theta_2 \end{pmatrix} \tag{19}$$

In the equation $\theta_1$ is a current rotation angle of the first shaft 301 before motions of the first shaft 301 and the second shaft 304 interfere with each other upon reception of external force, and $\theta_1'$ a current rotation angle of the first shaft 301 after the motions of the first shaft 301 and the second shaft 304 interfere with each other upon reception of external force. Similarly, $\theta_2$ and $\theta_2'$ are current rotation angles of the second shaft 304 before and after the motions of the first shaft 301 and the second shaft 304 interfere with each other upon reception of the external force.

Further, in equation (19), r10 and r20 show diameters of the first pulley 303 and the second pulley 306, respectively.

Equation (20) shows a result of stiffness control for a motor command value $\theta_1$ volt of motor driving the first shaft 301, using the tension $T_1$ on the interference belt 308 detected by the force detector 309 as well as the angles $\theta_1'$ and $\theta_2'$ from the equation (19). Similarly, equation (21) shows a result of position control for a motor speed command value $\theta_2$ volt of motor driving the second shaft 304.

$$\theta_1 \text{ volt} = Kp \cdot (\theta_1 \text{ ref} - \theta_1') + Ks \cdot T_1 \quad (20)$$

$$\theta_2 \text{ volt} = Kp \cdot (\theta_2 \text{ ref} - \theta_2') \quad (21)$$

In the equations, Kp stands for a position control gain, Ks for a stiffness control gain, and $\theta_1$ ref and $\theta_2$ ref for control targets of rotation angles of the first shaft 301 and the second shaft 304, respectively.

Next explained is an operation of the above embodiment.

Supposing an external force F is applied from the outside in an arbitrary direction by a collision against the robot.

(1) The case that the external force F is applied to the corresponding portion of the first shaft 301 and influence of the external force F may be detected directly by the force detector 309 irrespective of the second shaft 304.

The tension $T_1$ is detected by the force detector 309, and the first arm 302 is rotated to move up to a position where the tension $T_1$ is equilibrated with a determined component of the external force F by the stiffness control using the equation (20).

(2) The case that the external force F is applied to the corresponding portion of the second shaft 304.

When the external force F is applied, a torque occurs on the second pulley 306 of the second shaft and a tension $T_1$ is generated through the interference belt 308. Then the first shaft 301 rotates up to a position where the tension $T_1$ is equilibrated with a determined component of the external force F by the stiffness control. Simultaneously, the second shaft 304 rotates through the interference belt 308, so that it appears that the second shaft 304 is controlled to rotate by the stiffness control.

According to this arrangement of the present embodiment, since the interference means 323 is provided, the external force F applied to the corresponding portions of the respective shafts 301, 304 may be detected using one force detector 309.

Next explained with reference to FIG. 20 is a modification of the above embodiment.

In FIG. 20, one arm is equivalent to a portion corresponding to one freedom of the multi-degree-of-freedom robot 320 in FIG. 19. In the present embodiment, a result of an operation means 324 is transmitted to a drive means 325. The drive means 325 respectively drives a detection arm 321a and respective transmission arms 322a such that they kill an external force applied thereon, based on a force onto the detection arm 321a detected by a force detector 322 and on a force on the transmission arms 322a obtained by the operation means 324.

According to the modification, the drive means 325 is provided, so that the arms may be controlled to minimize an influence from a collision by killing the force applied from the outside onto the multi-degree-of-freedom robot 320.

Alternatively, the drive means 325 may be constructed such that an arm directly receiving the external force F is sought based on the forces on the detection arm 321a gained by the force detector 309 and on the transmission arms 322a gained by the operation means 324, and that the arm is moved to kill the external force F applied thereon.

As explained above, according to the present invention, the external force applied on the arm of multi-degree-of-freedom robot may be detected for respective freedoms with the small number of force detectors. Also the external force applied on the arm of the multi-degree-of-freedom robot may be detected for respective freedoms with the small number of force detectors to avoid a collision.

Fifth Embodiment

Below explained with the drawings is the fifth embodiment of the present invention.

FIGS. 21–24 are partial sectional side view, plan view, side view and sectional plan view, respectively, of a multi-joint apparatus forming a finger portion for multi-finger hand. The multi-joint apparatus is constituted by a base 401 and a plurality of frames 402, 403, 404, 405 successively connected in this order from the base. In detail, the first frame 402 is connected by a first joint 406 to the tip of the base 401, and the second frame 403 through a second joint 407, which is rotatable around an axis perpendicular to that of the first joint 406, to the tip of the first frame 402. Similarly, the third and the fourth frames 404, 405 are connected successively through the third joint 408 and the fourth joint 409, which are rotatable around an axis parallel to that of the second joint 407.

A contact sensor 410 is attached to the fourth frame 405 at the end. The contact sensor 410 has an elastic cap 410a made of an elastic material such as silicone rubber easily fit to a contacting object. The elastic cap 410a is held on a holding cylinder 405a provided at the tip of the fourth frame 405. The elastic cap 410a corresponds to a finger tip of human. A contact surface 410b of the elastic cap contacts with an object to be grasped, not shown, to grasp it. A cavity 410c is formed at least over almost the entire region of the contact surface 410b in the elastic cap 410a, and incompressible fluid, for example an oil, is filled in the cavity 410c. The cavity 410c further extends in a direction of central axis, the tip of which is connected to a pressure sensor 410 mounted on the fourth frame 405 as in the first embodiment.

When the object is grasped and the contact surface 410b is pressed against the object, a pressure of fluid in the cavity 410c changes and the pressure change is detected by the pressure sensor 411 to control a grasping force thereby.

Motors 412a, 412b, 412c, 412d are mounted correspondingly to the respective joints (four motors in this embodiment) in the base 410, and drive pulleys 413a, 413b, 413c, 413d are mounted on output shafts of the respective motors.

Figure 22:
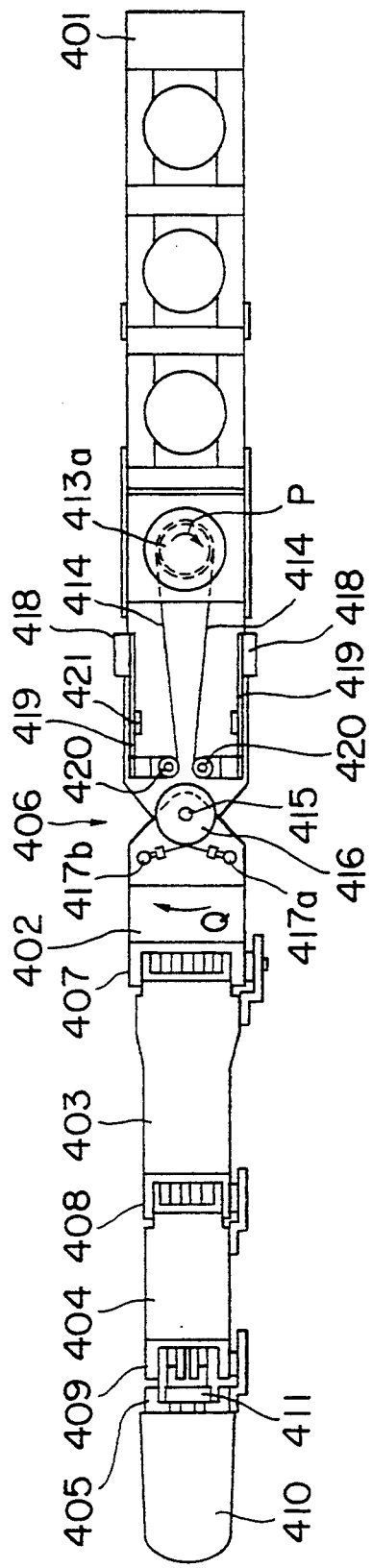
FIG. 22 is a plan view of the multi-joint apparatus shown in FIG. 21.

The drive pulley 413a is for drive of the first joint 406. A wire 414 is wound and fixed around the drive pulley 413a as shown in FIG. 22. One end of the wire 414 is wound around the pulley 416 on the shaft 415 of the first joint 406 and then secured to a pin 417a fixed on the first frame 402, and the other end of the wire 414 is wound around the pulley 416 and then secured to a pin 417b fixed on the first frame 401.

A pair of cantilevers 419 of plate spring are fixed at ends thereof by holders 418 on the base 401. Guide pulleys 420 are mounted at free ends of the cantilevers 419. Between the first joint 406 and the drive pulley 413a, the guide pulleys 420 are urged to the wire 414 extending between the drive pulley 413a and the pulley 416 by the elasticity of the cantilevers 419, to provide a tension on the wire 414. In detail, the cantilevers are bent to urge the guide pulleys towards the wire 414, so that the tension is applied onto the wire 414 by the returning force of the cantilevers 419.

Strain gauges 421 are attached to one side or both sides of the cantilevers 419. An amount of bending of the cantilevers 419 is detected by the strain gauge 421 to measure the tension on the wire 414 thereby.

Supposing the drive pulley 413a is rotated in the direction of arrow P in FIG. 22 by the motor 412a, the rotational force is transmitted through the wire 414 to the pin 417a to rotate the first frame 402 around the shaft 415 in the direction of arrow Q. If the drive pulley 413a is rotated in the direction opposite to the arrow P, the frame 402 rotates in the direction opposite to the arrow Q.

The drive pulleys 413b, 413c, 413d are for drive of the second, the third and the fourth joints 407, 408, 409. A wire 422 fixed to and wound around the drive pulley 431b at its end passes through a guide roller 424 rotatably mounted on a shaft 423 provided on the base 401, and through a guide roller 425 rotatably mounted on a shaft 415 of the first joint 406, is turned by a guide roller 420 journaled on the first frame 402, is wound around a pulley 420 freely rotatable on a shaft 427 of the second joint 407, and is fixed to a pin 429a secured on the second frame 403. Similarly, the other end of the wire 422 is passed through guide rollers 424, 425, 426, and secured to a pin 429b fixed on the second frame after wound around a pulley 428.

Figure 21:
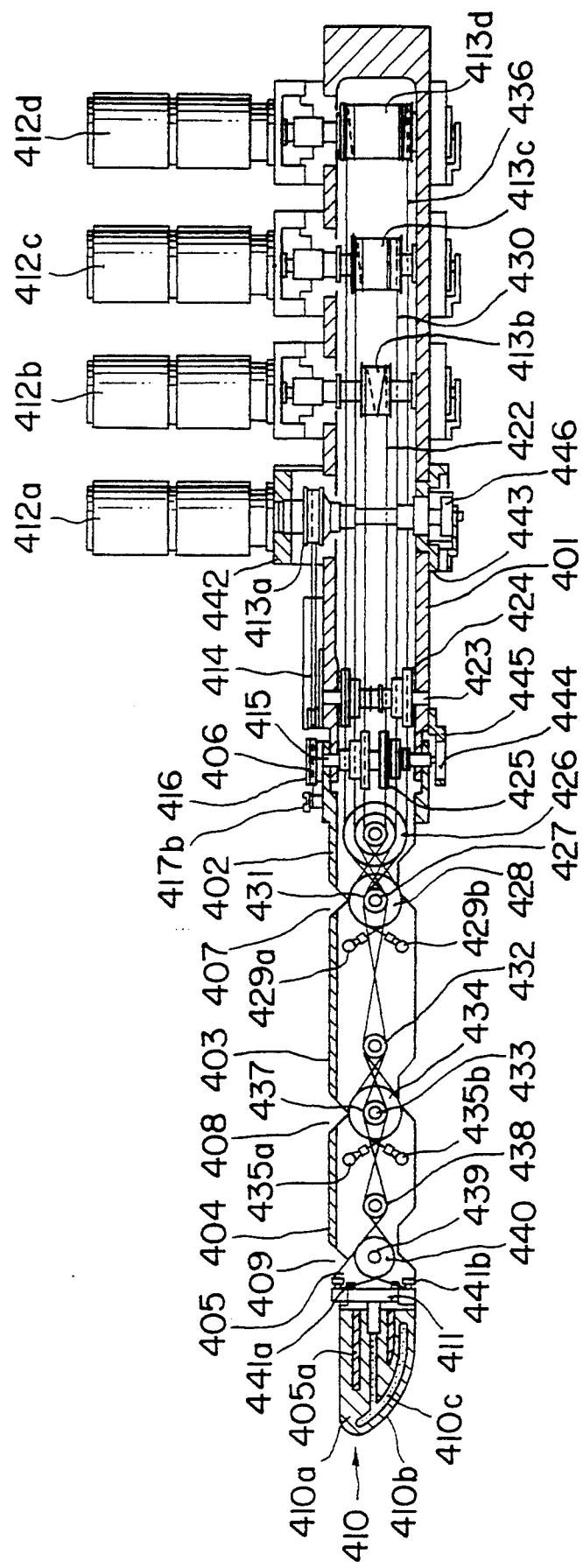
FIG. 21 is a partial sectional side view of a multi-joint apparatus to show the fifth embodiment of the present invention.

Then when the drive pulley 413b is rotated by the motor 412b in either direction, the rotational force is transmitted through the wire 422 to the pin 429a or 429b, which in turn rotates the second frame 403 about an axis of the second joint 403 in the vertical direction in FIG. 21.

Figure 23:
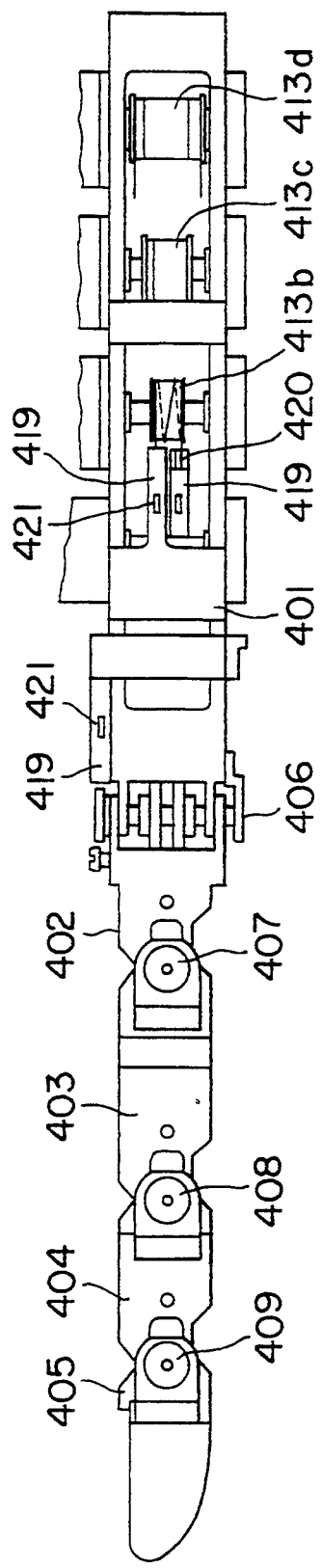
FIG. 23 is a side view of the multi-joint apparatus shown in FIG. 21.
Figure 24:
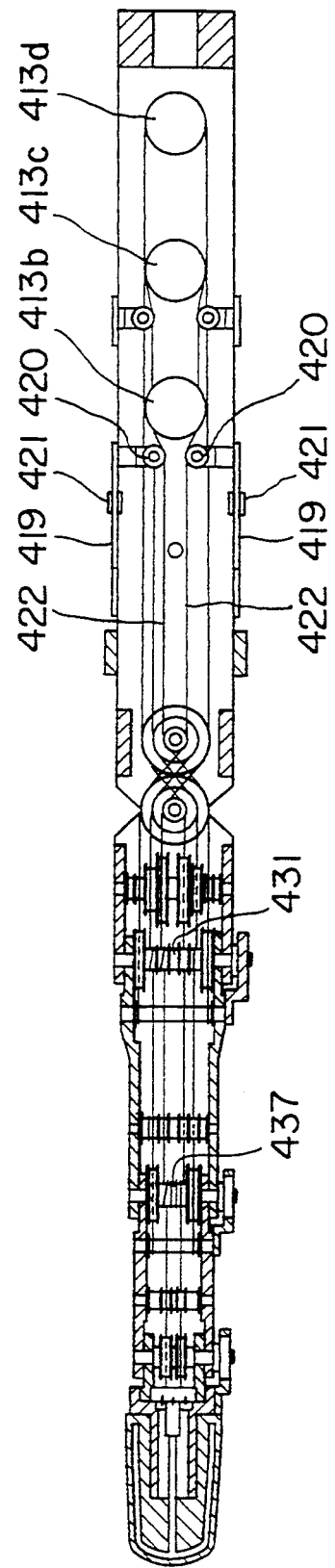
FIG. 24 is a sectional plan view of the multi-joint apparatus shown in FIG. 21.

As shown in FIGS. 23 and 24, a tension sensor is provided on the wire 422 near the drive pulley 413b, which comprises cantilevers 419 and guide rollers 420 similar to those shown in FIG. 21. The wire 422 is urged through the guide rollers 420 by the cantilevers 419 to always keep its tension. Strain gauges stuck to the cantilevers 419 measure the tension on the wire 422 by detecting an amount of bending of the cantilevers 419.

A wire 430 is wound around and fixed to the drive pulley 413c. One end of the wire 430 is passed through the guide roller 424 and the guide roller 425 on the shaft 415, turned in direction by the guide roller 426 journaled on the first frame 402, then wound around the guide roller 431 on the shaft 427 of the second joint 407 by a rotation, passed through the guide roller 432 journaled on the second frame 403, wound around the pulley 434 freely rotatable on a shaft 433 of the third joint 408, and secured to a pin 435a fixed to the third frame 404. Also, the other end of the wire 430 is passed through the respective guide rollers, wound around the pulley 434, and secured to a pin 435b fixed to the third frame 404.

Similarly, the wire 436 is wound around and fixed to the drive pulley 413d. Similarly as the wire 430, the ends of the wire 436 are passed through the guide roller 432, wound by a rotation around a guide roller 437 on the shaft 433 of the third joint 408, passed through a guide roller 438 journaled on the third frame 404, wound around a pulley 440 freely rotatable on the shaft 439 of the fourth joint 409, and then secured to a pin 441a or a pin 441b fixed to the fourth frame 405.

When the motors 412c, 412d rotate the drive pulleys 413c, 413d, the third frame 404 and the fourth frame 405 rotate about the third joint 408 and the fourth joint 409 vertically in the drawings similarly as the second frame 403.

In the above embodiment, there is no tension sensor comprising cantilevers 419 and the guide rollers 420 for the wires 430, 436. The tension sensors may be arranged for the wires 430, 436 if necessary. In order to set the motors at a position where the tension is applied on the wire, the holders 442, 443 may be so structured as to move by a small amount on the base 401 in case of the motor 412a, and to be secured by screws.

Further, the detection of rotation angles of the respective joints may be effected by potentiometers. For example, a potentiometer 444 is connected to one end of the shaft 415 of the joint 406 by its rotation shaft, and a case of the potentiometer 444 is secured to the base 401 by a holder 445. Then the potentiometer 444 detects the rotation angles of respective joints, detecting a posture of finger. Also the detection of rotation of pulley on the motor shaft may be detection by a potentiometer 446, and tachogenerator or an encoder may be combined with the motor with necessity.

Figure 25:
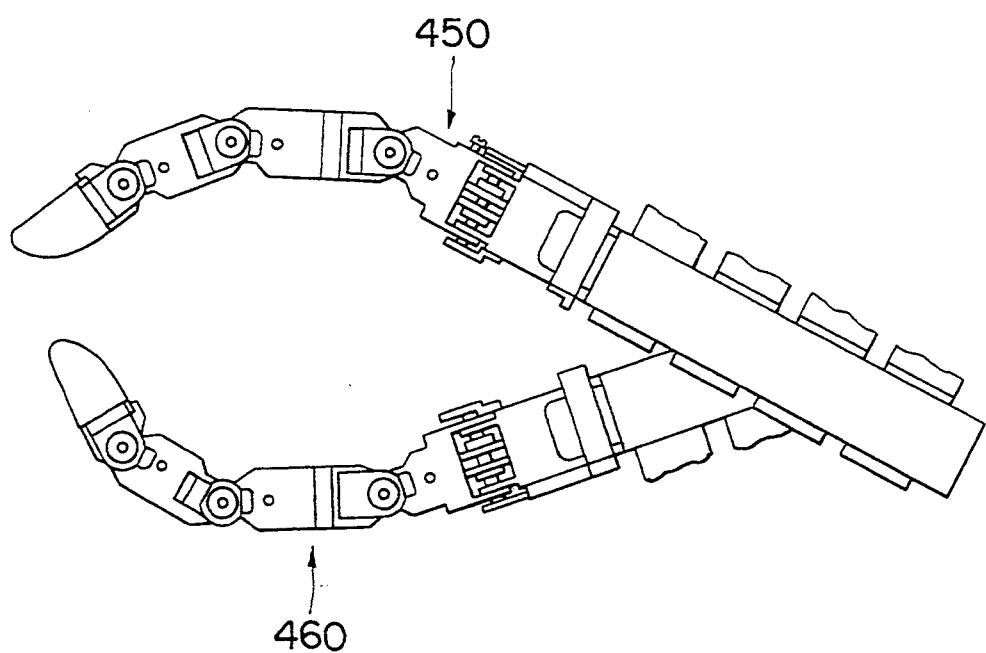
FIG. 25 is a side view showing an example of application of the multi-joint apparatus shown in FIG. 21 for a multi-finger hand.
Figure 26:
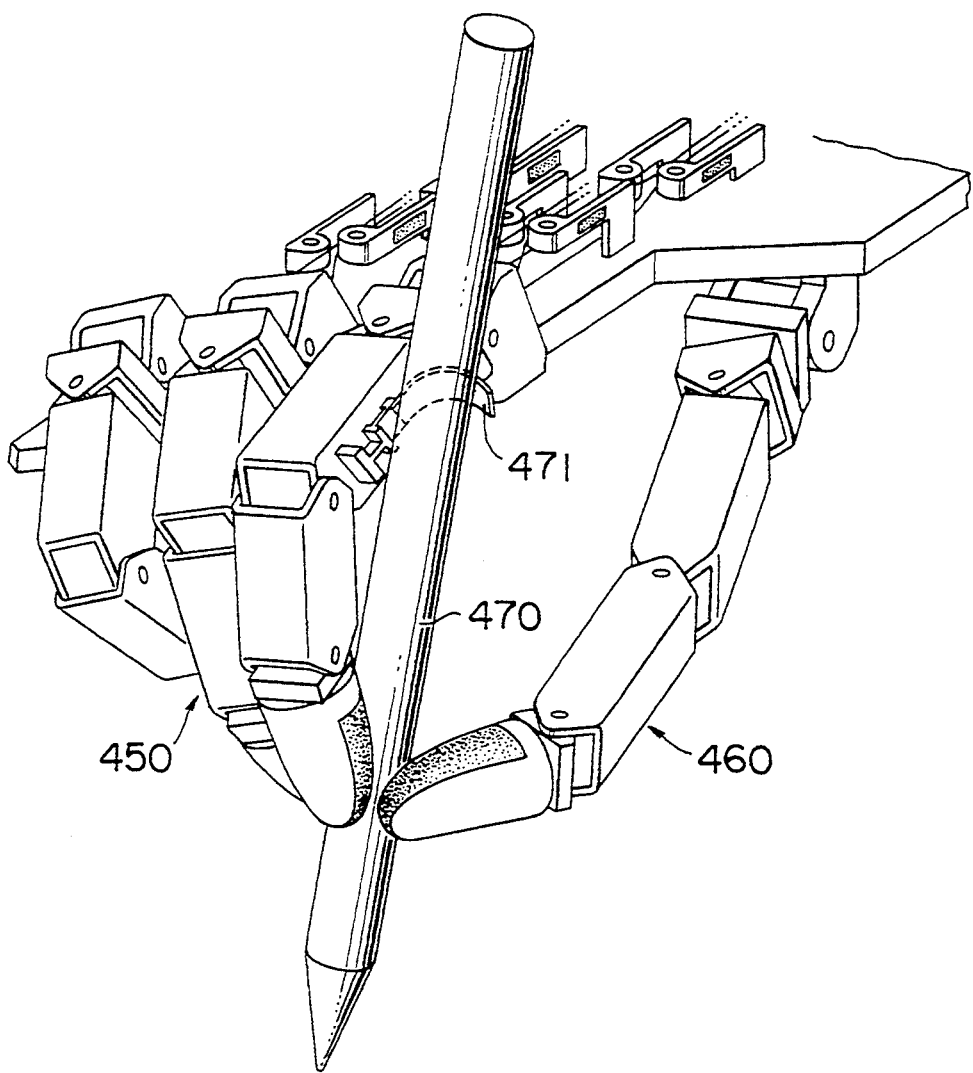
FIG. 26 is a perspective view showing another example of application of the multi-joint apparatus shown in FIG. 21 for a multi-finger hand.

FIGS. 25 and 26 show a state of multi-finger hand mounted on a tip of arm of an industrial robot with a plurality of the multi-joint apparatus as constructed as above. As so constructed, the respective frames are rotated around the respective joints by determined angles to grasp an object by controlling the respective motors of the multi-joint apparatus 450, 460 arranged as opposed to each other.

As shown in FIG. 26, the robot may perform an operation of writing of characters by a pen 470. A thumb, an index finger and a middle finger of the multi-finger hand grip the fore end of the pen 470, and the rear end of the pen 470 is set on a holder 471 fixed to the index finger.

Figure 27:
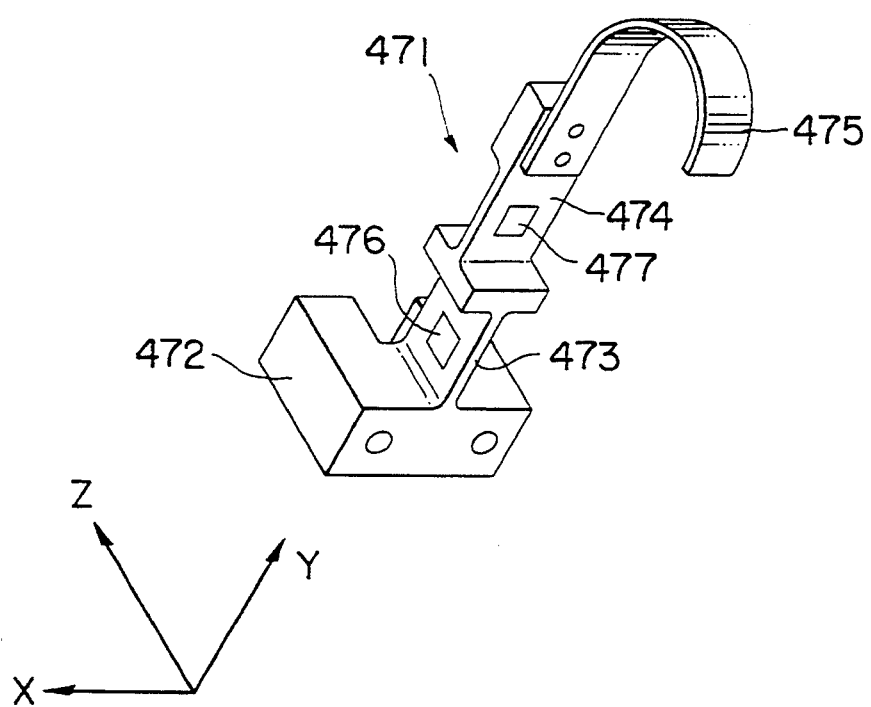
FIG. 27 is an enlarged perspective view of a holding member shown in FIG. 26.

FIG. 27 shows a structure of the holder 471. The holder 471 has a base 472, a thin portion 473 bendable in the x-direction, another thin portion 474 bendable in the z-direction, and a holding portion 475 of arch shape at the tip thereof. Strain gauges 476, 477 are stuck to the respective thin portions 473, 474. When a force acts onto the holding portion 475, the strain gauges 476, 477 detect components of the force in the three directions.

In case that the multi-joint apparatus is used as shown in FIG. 26, a contact pressure of the finger tip may be detected by touch sensors provided at least on the thumb and the index finger. The holder 471 detects the contact force of pen 470 against a sheet. Similarly, forces on the respective fingers are detected from tensions on the joint drive wires provided for respective fingers, and rotation angles of the respective shaft from potentiometers at the respective joints. Thus controlling the multi-finger hand by the sensors in the respective portions of the hand, the hand can perform writing of characters by the pen 470.

Although the multi-joint apparatus is applied for the multi-finger hand in the above embodiments, it may also be applied for a multi-joint arm.

As explained above, in the wire driven multi-joint apparatus according to the present invention, the guide pulleys provided at the tips of cantilevers are coupled with the wires between the joints and the drive pulleys, and the wires are urged through the guide pulleys in the direction to keep the tension. Therefore, even when the wire is stretched, the wire may always keep a predetermined tension. Furthermore, the tension on the wires is detected by an amount of bending of the cantilevers by means of strain gauges stuck to the cantilevers. Thus, even when the wire is stretched, the tension may be always detected surely. Feedback of the tension values to the motor Control may prevent excessive loads applied on the respective joints, keeping the stable motions of joints.

What is claimed is:

1. A fingertip tactile sensor device for a robot hand, comprising:
   an easily deformable elastic cap having a centrally located longitudinal axis, first and second hollow portions, and a contact surface;
   an incompressible fluid for filling the first hollow portion;
   the first hollow portion including a first section which extends adjacent the contact surface and a second section which extends along the centrally located longitudinal axis wherein the second section terminates in an opening at a base end of the cap;
   the second hollow portion being concentrically disposed around the second section of the first hollow portion and being open at the base end of the cap;
   a holder having a cylinder insertable into the second hollow portion for holding the cap in place; and
   a pressure detector for detecting a pressure of the incompressible fluid and being disposed at the opening of the second section of the first hollow portion.

2. A fingertip tactile sensor device according to claim 1, wherein the elastic cap further comprises a tip end and wherein the longitudinal axis extends from the base end to the tip end and an external shape of the elastic cap is such that cross sections of the elastic cap which are taken at various points normal to the longitudinal axis are each elliptical.

3. A fingertip tactile sensor device according to claim 2, wherein the elliptical cross sections become progressively smaller from the base end to the tip end.

4. A fingertip tactile sensor device according to claim 1, wherein the first section of the first hollow portion is disposed between the contact surface of the elastic cap and the second hollow portion.

5. A fingertip tactile sensor device for a robot hand, comprising:
   an easily deformable elastic cap having a centrally located longitudinal axis, first and second hollow portions, and a contact surface;
   an incompressible fluid for filling the first hollow portion;
   the first hollow portion including a first section which extends adjacent the contact surface and a second section which extends along the centrally located longitudinal axis;
   the second hollow portion being concentrically disposed around the second section of the first hollow portion and being open at the base end of the cap;
   a holder having a cylinder insertable into the second hollow portion for holding the cap in place; and
   a pressure detector for detecting a pressure of the incompressible fluid.

6. A fingertip tactile sensor device according to claim 5, wherein the second section terminates in an opening at a base end of the cap.

7. A fingertip tactile sensor device according to claim 6, wherein the pressure detector is disposed at the opening.

8. A fingertip tactile sensor device according to claim 7, wherein the pressure detector is disposed in the opening.

9. A fingertip tactile sensor device according to claim 5, further comprising a robot finger which is hingedly connected to said holder whereby the fingertip tactile sensor is swingable relative to the robot finger.

* * * * *